3,618,162
PLASTIC PELLETIZER UNDERWATER
PELLETIZING HEAD
Hans R. Scharer, Wallingford, and Donald C. Chase,
Orange, Conn., assignors to USM Corporation, Boston,
Mass.
Filed Oct. 2, 1969, Ser. No. 863,151
Int. Cl. B29f 3/02, 3/04, 3/08
U.S. Cl. 18—1 B                              9 Claims

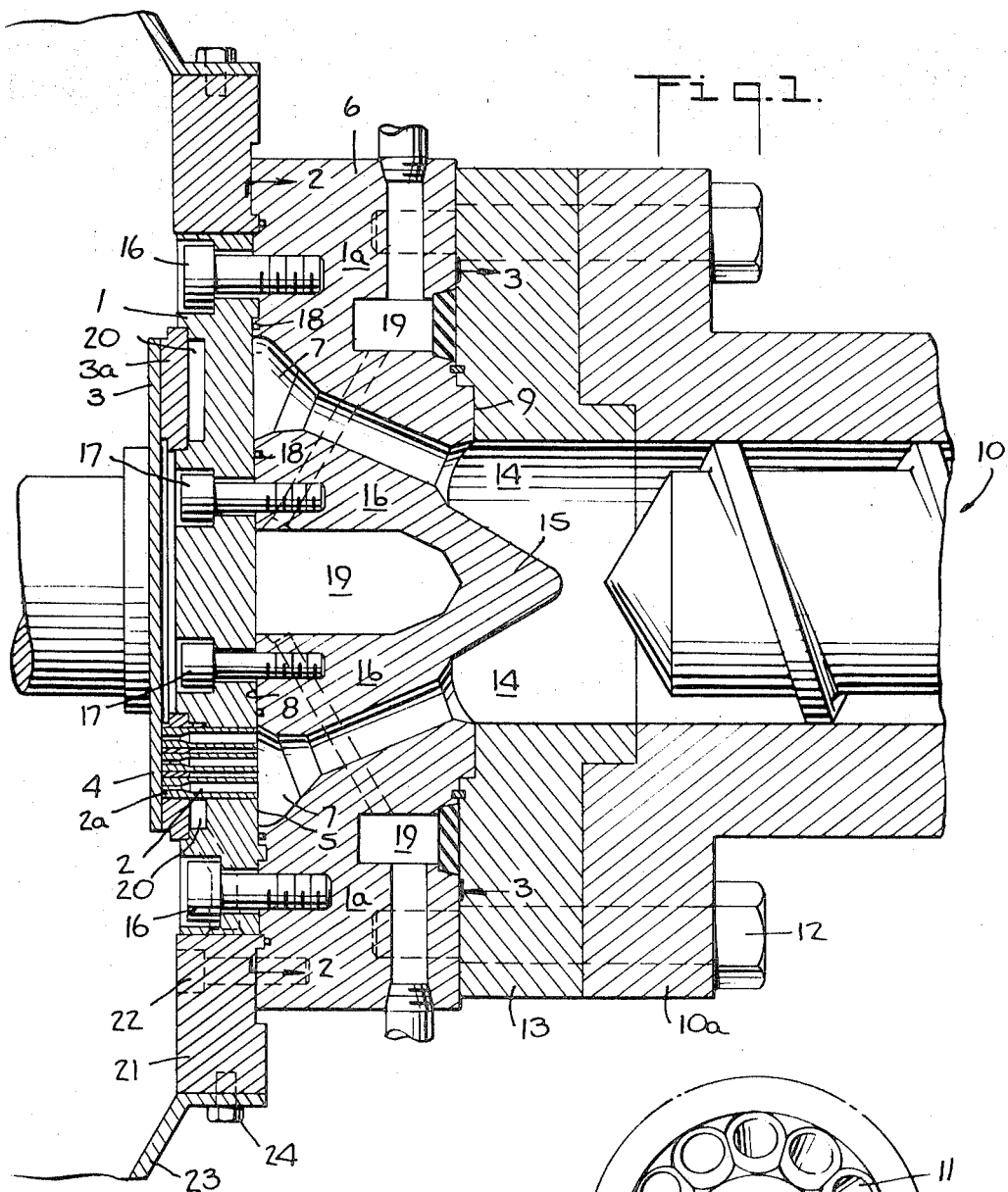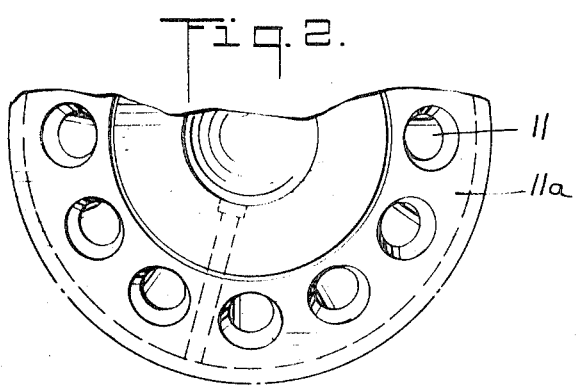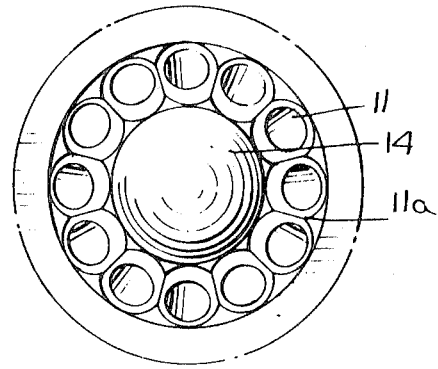

ABSTRACT OF THE DISCLOSURE

A plastic pelletizer underwater pelletizing head has a pellet plate support constructed to support the pellet plate against bending under the force of the plastic, by providing for screwing the pellet plate to the support by screws arranged on the inside of the pellet plate's annular series of plastic extrusion holes as well as on the outside of this series of holes, and constructed to shield the pellet plate from plastic pressure throughout its generally central area.

---

This invention relates to a plastic pelletizer underwater pelletizing head.

Such a head is used to convert plastic to pellets which can be easily handled or shipped for further processing. The head comprises a pellet plate support which is fastened to the discharge end of an extruder, for example, a thermoplastic plastic extruder, usually of the screw type. A pellet plate having an annular series of plastic extruding holes is fastened to the front end of this support, and a backwardly pointing plastic diverging cone is fastened to or, usually, made an integral part of the backside of this plate. The support is formed with a diverging or generally conical space forming with the cone a diverging passage open at its small end to the extruder so that plasticized plastic extruded by the latter is forced by the cone into a diverging or spreading flow which travels to the annular series of plastic extrusion holes. The front face of the pellet plate is under water which rapidly cools and solidifies the plastic extruded through the extruding holes, and rotary knives having blades rotating on the pellet plate's front face cuts the solidified or solidifying extruded plastic into pellets which are eventually removed from the water.

The forwardly extruding plastic exerts a forward force on the cone which is transmitted to the pellet plate on the inside of the annular series of holes, and the pellet plate directly receives a forward force from the plastic being forced through these holes and against the adjacent portion of the plate.

Because the cone is fastened to the backside of the pellet plate, the pellet plate can be fastened to the pellet plate's support only by screws located beyond the outer periphery of the pellet plate's annular series of plastic extruded holes. Therefore, the above mentioned forward forces are transmitted back to the discharge end of the extruder by way of the outer periphery of the pellet plate. Under these circumstances the pellet plate tends to bend or bulge centrally forwardly to a degree which prevents the blades of the rotary knife from operating in the parallel relationship with the front face of the pellet plate required to cleanly sever pellets from the plastic extruded through the holes of the pellet plate. Such a condition also results in rapid reduction in the service life of the blades of the rotary knife.

An example of such a prior art construction is shown by the Palmer et al. U.S. Pat. 3,114,169, dated Dec. 17, 1963.

The purpose of the present invention is to overcome this problem of the pellet plate being bulged or deformed forwardly by the force of the extruding plastic. In other words, the purpose is to keep the front face of the pellet plate in a flat condition so that the blades of the rotary knife can work smoothly on this face.

With the above in mind, the invention may be summarized by saying that with it the pellet plate support is constructed as an integral unit formed so its front end completely surrounds the inner and outer peripheries of an annular space or manifold which registers with the annular series of holes on the backside of the pellet plate, and it integrally provides inner and outer portions extending radially inwardly and outwardly from this space, and means such as screws for fastening the pellet plate to both the inner and outer portions just described at locations radially spanning the annular space behind the annular series of holes in the pellet plate. The inner and outer portions of this new pellet plate support are joined integrally together because the support is formed from a solid mass of metal with an annular series of diverging holes extending longitudinally through the support from its back end to the annular space or manifold to provide interposed integral walls solidly interconnecting these portions. The inner one of these portions is used to provide a support for the cone which initially spreads the plastic, and this cone is preferably an integral part of this portion.

With the above construction, the plastic extruded by the discharge end of the extruder is forced over the cone which through the integral portions of the support transmit this forward force back to the end of the extruder to which the support is fastened. The pellet plate does not receive this force. The diverging holes formed in the support conduct the plastic to the annular space open to the annular series of holes in the pellet plate which is fastened on both sides of these holes to the inner and outer integral portions of the pellet plate's support. None of this diverging force reaches the pellet plate in any way. The only force which the pellet plate itself has to carry is that exerted against its annular portion through which the annular series of holes is formed. This annular portion of the pellet plate is supported on both sides radially inwardly and outwardly with respect to the annular series of holes. It follows that the pellet plate is rigidly supported against bending or bulging where it receives a forward force, and that the blades of the knife can therefore operate smoothly against the front face of the pellet plate to produce cleanly cut pellets without undue wear or damage to the blades of the rotary knife.

A specific example of a head embodying the invention is illustrated by the accompanying drawings in which:
FIG. 1 is a longitudinal section of the head;
FIG. 2 is a cross section taken on line 2—2 in FIG. 1; and
FIG. 3 is a back view as seen on the line 3—3 in FIG. 1.

Referring to these drawings, the illustrated plastic pelletizer underwater pelletizing head includes a pellet plate 1 having within its periphery an annular series of holes 2 extending through the plate and a front face 3 to which these holes open and on which the blades 4 of a rotary knife can ride to pelletize plastic extruded forwardly through the holes 2, the plate having a backside 5 to which these holes open to receive plastic.

The pellet plate support 6 is made from a solid mass of metal shaped to form an annular space 7 registering with the holes 2 and having a front end 8 to which the space 7 opens and to which the pellet plate's back side 5 is fastened, and a back mounting end 9 for connection to the discharge end 10 of a plastic extruder of which only this discharge end is illustrated. The support provides the forwardly diverging passage means in the form of an annular series of holes 11 opening to the back end of the support 6 to receive plastic from the extruder's discharge end 10 and conduct the plastic forwardly to the space 7. The support is connected to the extruder's end 10 by an annular series of screws 12 which pass through holes formed in a flange 10a on the extruder's end and into threaded holes formed in the back end of the support 6. An intermediate spacer 13 may be interposed between the extruder's end 10 and the back end of the support 6 and serve to form an annular entrance 14 into which the backwardly pointing cone 15 extends for initially spreading the plastic extruded forwardly from the extruder's end 10, although the annular entrance 14 may also be made as an integral part of the extruder 10.

The annular space 7 functions as a manifold where the plastic conducted by the passages 11 can rejoin as a solid body of substantially uniform fluid pressure. The pellet plate support as an integral unit completely surrounds both the inner and outer peripheries of the annular space and provides inner and outer annular portions 1a and 1b respectively extending radially inwardly and outwardly from this space. The portions 1a and 1b are integrally joined by the portion 11a through which the holes 11 are formed. An annular series of screws 16 which extend into threaded holes formed in the support 6 connect the pellet plate 1 to the support 6 on the outside of the annular series of holes, and an annular series of screws 17 connect the inner portion of the pellet plate to the support 6 on the inside of this series of holes, these screws 17 also being screwed into threaded holes formed in the support. The two annular series of screws 16 and 17 radially span the annular portion of the pellet plate in which the holes 2 are formed and they, of course, span the annular space 7.

The support 6 is an integral unit as previously mentioned, this including all portions which the screws 16 and 17 engage as well as the backwardly pointing cone 15. The screws 16 lock the pellet plate to the portion 1a of the support 6 and the screws 17 lock the plate to the portion 1b of the support, all portions of the support plate engaged by these screws being part of an integral mass of metal.

Metal O-rings 18 located on the radial inside and outside of the space 7 prevent the escape of plastic from the chamber 7 between the interfaces 5 and 8 of the pellet plate and its support. The only hydrostatic pressure carried by the pellet plate 1 is on its annular portion encompassed by the space 7 and through which the holes 2 are formed. This annular area is locked to the solid support by screws located on both the inner and outer peripheries of this annular area. The plate is locked solidly against displacement throughout this annular area.

In the prior art construction, exemplified by the previously identified Palmer et al. patent, only the annular series of screws 16 can be used. Moreover, the cone 15 is supported by the pellet plate inside of the annular series of holes 2. Thus, all the thrust of the advancing plastic is carried by the pellet plate support only by the outer screws 16. In the illustrated example of this invention the cone 15 is supported by being made directly a part of the support 6 so that the forward thrust of the plastic throughout all of the central area of the pellet plate is transmitted by the support 6 directly back to the extruder's end 10. This would also be true if the cone were made a separate part, but supported by the support's portion 1b. The only thrust against the plate itself is throughout its area exposed to the chamber or manifold 7 and the plate is supported on both radial sides of this area.

Because of the foregoing advantages, the pellet plate remains rigid during the operation of the pelletizer when using a plate of normal thickness. It is impractical to increase the thickness of a pellet plate because this of necessity results in lengthening of the holes 2 with consequent excessive loading of the extruder which must then push the plastic through the longer holes. These holes must be of rather small effective final diameters desirably ranging in size from about .078 inch to .100 inch, for example.

The support 6 may be provided with chambers 19 through which heating liquid may be passed to heat the support 6. The pellet plate itself may have heating chambers 20 to prevent solidification of the plastic through premature removal of heat by the water in which the front face of the pellet plate is, of course, submerged. The holes 2 are shown as formed by tubes 2a brazed or welded in holes formed through the pellet plate 1 while the front face 3 of the pellet plate may be formed by a metal ring 3a fixed to the plate by welding or brazing. The plate's heating chamber surrounds the tubes 2a and comprises a recess formed in the front of the plate 1 and closed by the metal ring 3a.

It is a further feature of the invention that the pellet plate support 6 is constructed to provide a short dwell time for the plastic material being extruded. In place of the conical space taught by the Palmer et al. patent, a series of relatively low volume holes 11 are used in combination with a pressure equalizing manifold space 7 and an independently controllable series of heat regulating chambers 19 is provided. The heat regulation of the pellet plate support 6 may thus be independently controlled with respect to the heat regulation of the pellet plate 1 and the tubes 2a which lie immediately adjacent the chilling liquid into which the plastic is extruded.

A mounting member 21 surounds the pellet plate 1 and is connected to the support 6 by an annular series of screws 22. The outer periphery of this mounting member connects with the tank wall 23 to which it is connected by screws 24. Only a portion of the tank wall is shown, as being understood that this tank contains the water into which the plastic is extruded for pelletizing.

What is claimed is:

1. A plastic pelletizer underwater pelletizing head including a pellet plate having spaced within its periphery a series of holes extending through the plate and a front face to which these holes open and on which a rotary knife can ride to pelletize plastic extruded forwardly through the holes and a back side to which these holes open to receive plastic, a pellet plate support having a front end to which the pellet plate's back side is fastened, a forwardly diverging passage means opening to receive plastic from the extruder's discharge end and to conduct it forwardly to said holes with a backwardly pointing cone for spreading plastic extruded forwardly from the extruder's discharge end; wherein the improvement comprises constructing the backwardly pointing cone with a forwardly diverging passage as a part of the pellet plate support so that the pressure received by said cone and passage are carried directly by said support.

2. The head of claim 1 in which a seal is provided between said plate and said support which is disposed inwardly of said holes so as to preclude plastic from flowing behind the generally central portion of said plate and from exerting any pressure upon said plate throughout its generally central area.

3. The head of claim 2 in which said forwardly diverging passage means comprises a series of generally conically arranged individual passage ways terminating in an annular manifold space disposed immediately behind the back side to which said holes open to receive plastic, and a heat regulating means is provided adjacent said individual passages which is independently controllable with respect to such heat regulation means as may be incorporated in said pellet plate so that adequate flow through the reduced aggregate volume of said forwardly diverging passage means may be achieved.

4. The head of claim 2 in which the pellet plate is affixed to and supported by the pellet plate support about a circumference disposed outwardly of said holes and also about a circumference disposed inwardly of said holes.

5. A plastic pelletizer underwater pelletizing head including a pellet plate having spaced within its periphery an annular series of holes extending through the plate and a front face to which these holes open and on which a rotary knife can ride to pelletize plastic extruded forwardly through the holes and a back side to which these holes open to receive plastic, a pellet plate support having a front end to which the pellet plate's back side is fastened, a forwardly diverging passage means opening to receive plastic from the extruder's discharge end and to conduct it forwardly to said holes with a backwardly pointing cone for spreading plastic extruding forwardly from the extruder's discharge end; wherein the improvement comprises construction of the pellet plate support to form an annular space immediately behind said holes with the pellet plate front end completely surrounding both the inner and outer peripheries of said annular space, to form inner and outer portions extending radially inwardly and outwardly from this space and wherein the forwardly diverging passage means are formed with the backwardly pointing cone as a part of an integral pellet plate support unit.

6. The head of claim 5 wherein the pellet plate is fastened to the said outer portion extending radially outwardly from the annular space and fastened to said inner portion extending radially inwardly from the annular space.

7. The head of claim 6 in which seals are provided between the plate and its support on both sides of said annular space.

8. The head of claim 6 in which said fastening means comprises annular series of screws extending through said plate and engaging said support on both radial sides of said annular space.

9. The head of claim 5 with means for fastening the pellet plate to both said inner and outer portions at locations radially spanning said space and said annular series of holes, said forwardly diverging passage means comprising an annular series of diverging holes formed in said support and extending between its integral portions through the support with integral walls interconnecting said portions and with the radially inner one of said portions providing a support for said cone.

References Cited

UNITED STATES PATENTS

| 2,908,938 | 10/1959 | Taylor | 18—12 B UX |
| 3,105,269 | 10/1963 | Seubert | 18—12 DM X |
| 3,114,169 | 12/1963 | Palmer et al. | 18—12 A |
| 3,197,533 | 7/1965 | Robinson et al. | 18—12 B X |

FOREIGN PATENTS

| 521,092 | 1/1956 | Canada | 18—12 B |
| 982,729 | 2/1965 | Great Britain | 18—12 B |

ROBERT L. SPICER, JR., Primary Examiner

U.S. Cl. X.R.

18—12 A, 12 SE, 12 B